United States Patent
Kumon et al.

(10) Patent No.: US 11,866,615 B2
(45) Date of Patent: Jan. 9, 2024

(54) HOT-MELT COMPOSITION AND SEALING MATERIAL

(71) Applicant: ASAHI CHEMICAL SYNTHETIC CO., LTD., Tokyo (JP)

(72) Inventors: Daisuke Kumon, Tokyo (JP); Akito Nakagawa, Tokyo (JP)

(73) Assignee: ASAHI CHEMICAL SYNTHETIC CO., LTD., Tokyo (JP)

(*) Notice: Subject to any disclaimer, the term of this patent is extended or adjusted under 35 U.S.C. 154(b) by 615 days.

(21) Appl. No.: 17/255,248

(22) PCT Filed: Oct. 11, 2019

(86) PCT No.: PCT/JP2019/040193
§ 371 (c)(1),
(2) Date: Dec. 22, 2020

(87) PCT Pub. No.: WO2020/080280
PCT Pub. Date: Apr. 23, 2020

(65) Prior Publication Data
US 2021/0261835 A1 Aug. 26, 2021

(30) Foreign Application Priority Data
Oct. 18, 2018 (JP) ................. 2018-196399

(51) Int. Cl.
| | | |
|---|---|---|
| C09J 109/06 | (2006.01) | |
| C09J 125/10 | (2006.01) | |
| C09J 153/02 | (2006.01) | |
| C09J 5/06 | (2006.01) | |
| C09J 11/06 | (2006.01) | |
| C09J 11/08 | (2006.01) | |

(52) U.S. Cl.
CPC ............ *C09J 153/025* (2013.01); *C09J 5/06* (2013.01); *C09J 11/06* (2013.01); *C09J 11/08* (2013.01); *C09J 109/06* (2013.01); *C09J 125/10* (2013.01); *C09J 2453/00* (2013.01)

(58) Field of Classification Search
None
See application file for complete search history.

(56) References Cited

U.S. PATENT DOCUMENTS

| | | | |
|---|---|---|---|
| 11,753,569 B2* | 9/2023 | Yamauchi | C09J 153/02 524/505 |
| 2006/0241235 A1 | 10/2006 | Givord et al. | |
| 2019/0040289 A1 | 2/2019 | Dobashi et al. | |
| 2021/0024791 A1* | 1/2021 | Biyajima | C09J 125/04 |

FOREIGN PATENT DOCUMENTS

| | | |
|---|---|---|
| JP | 2001-81277 A | 3/2001 |
| JP | 2006-249433 A | 9/2006 |
| JP | 2008-127473 A | 6/2008 |
| JP | 2011-80021 A | 4/2011 |
| JP | 2011-190287 A | 9/2011 |
| JP | 2016-88971 A | 5/2016 |
| JP | 2017-57382 A | 3/2017 |
| JP | 2017-179061 A | 10/2017 |
| JP | 2017-186527 A | 10/2017 |
| JP | 2017-214479 A | 12/2017 |
| WO | 2015/159912 A1 | 10/2015 |
| WO | WO-2016006352 A1 * | 1/2016 ............. B32B 27/00 |

OTHER PUBLICATIONS

Dec. 10, 2019 International Search Report issued in International Patent Application No. PCT/JP2019/040193.

* cited by examiner

Primary Examiner — Richard A Huhn
(74) Attorney, Agent, or Firm — Oliff PLC

(57) ABSTRACT

This hot-melt composition contains, per 100 parts by mass of a hydrogenated styrene thermoplastic elastomer having a styrene-based polymer block at both ends thereof and a hydrogenated diene polymer block at a middle portion thereof, and having a mass-average molecular weight of 250,000 to 600,000, 150 to 450 parts by mass of an aromatic tackifying resin having a softening point of 135 to 160° C. and a mass-average molecular weight of 500 to 2,500, 100 to 500 parts by mass of a tackifying resin for a hydrogenated diene polymer block which has a softening point of 100 to 160° C., 500 to 1,500 parts by mass of a non-aromatic hydrocarbon oil having a kinematic viscosity at 40° C. of 90 mm$^2$/s or higher, wherein 30% by mass or more of the non-aromatic hydrocarbon oil is a non-aromatic hydrocarbon oil having a kinematic viscosity at 40° C. of 300 to 500 mm$^2$/s.

10 Claims, No Drawings

HOT-MELT COMPOSITION AND SEALING MATERIAL

BACKGROUND OF THE INVENTION

Field of the Invention

This invention relates to a hot-melt composition and a sealing material which are suitably used as a hot-melt adhesive in the fields of automobiles, vehicles and the like, more specifically, relates to a hot-melt composition and a sealing material which are excellent in adhesion to a substrate and easy peel ability.

Description of the Related Art

In recent years, in various industrial fields such as electricity, automobiles, and construction, methods for adhering members used for assembly with a hot-melt adhesive have been widely used. For example, for assembly of headlamps or tail lamps of an automobile, a hot-melt adhesive which is obtained by blending a thermoplastic elastomer with a large amount of a softener is used to bond a plastic housing which holds a light source and a lens which protects the light source. When the members are bonded with the hot-melt adhesive, it is desirable that a member for adhesion and an adherend are bonded with each other with a desired adhesive strength, but if the members are too strongly bonded, it becomes difficult to replace the members when replacement of the members is required during use. In addition, when a product is disassembled after use, from the viewpoint of effective use of resources and environmental measures, it is desired that the members are easily separated, that is, the members are excellent in easy peel ability (or easy separation), in order to facilitate recycling of each member. As described above, for the hot-melt adhesive, it is desired that not only a good sealing property between the members is secured by imparting appropriate adhesion during bonding, but easy peel ability is also excellent.

Conventionally, as a hot-melt composition excellent in adhesion and easy peel ability, a composition is proposed in which polyphenylene ether and a large amount of liquid softener are blended with a styrene thermoplastic elastomer and a softening point is adjusted to 130° C. to 240° C. (Patent Literature 1). In examples of this literature, a composition is described in which 100 parts by mass of polyphenylene ether, 200 parts by mass of a styrene-based resin (ENDEX155), and 500 parts by mass of a process oil are blended with 100 parts by mass of a styrene thermoplastic elastomer (see Example 1). The hot-melt composition has characteristics of being excellent in heat resistance and adhesion and capable of easily separate a member for adhesion from an adherend. However, it is not necessarily sufficient for current market demands for higher flexibility and adhesion.

In addition, in Patent Literature 2, a hot-melt composition having easy peel ability is proposed which is obtained by blending 5 to 500 parts by mass of a tackifiying resin having a hydroxyl group and 350 to 2,000 parts by mass of a hydrocarbon plasticizer with 100 parts by mass of SEEPS (a hydrogenated product of styrene-isoprene/butadiene-styrene type triblock polymer) or SEBS (a hydrogenated product of styrene-butadiene-styrene type triblock polymer) having a weight-average molecular weight of 250,000 or higher (see claim 1). In this composition, the easy peel ability is imparted by arranging a difference in polarity between the tackifying resin and a polyolefin used as a substrate, but the hot-melt composition has a problem that heat stability and adhesion to the substrate is low.

Furthermore, in Patent Literature 3, as a hot-melt composition suitable for use under severe conditions in automobile-related applications, a composition is proposed which is obtained by blending a hydrogenated hydrocarbon tackifying resin and a plasticizer with a styrene thermoplastic elastomer in which a diene polymer blocks is hydrogenated (see claim 1), and it is described that a tackifying resin compatible with styrene-based polymer blocks at both ends, for example, homopolymers or copolymers of aromatic monomers such as styrene, α-methyl styrene, vinyltoluene, indene and the like, are preferably blended as a reinforcing resin for a styrene-based polymer block phase (see paragraph 0020). Besides, in examples, a hot-melt composition is described which includes 8 parts by mass of a styrene thermoplastic elastomer (an equivalent mixture of a hydrogenated styrene-based triblock polymer and a hydrogenated styrene-based diblock polymer), 33 parts by mass of a tackifying resin, 46.3 parts by mass of an oil and 2 parts by mass of an aromatic resin (ENDEX155) (see Example 1 and Table 1). However, since this composition includes a large amount of the styrene-based diblock polymer in the elastomer component, there is a problem that the heat resistance and cohesive force are insufficient, and further, retention ability of the liquid softener is inferior. In addition, there is also a problem that an adhesive force to a substrate made of polycarbonate which are frequently used as a member for automobile lamps in recent years is poor.

On the other hand, in Patent Literature 4, a hot-melt composition which focuses on an aromatic resin used as a tackifying resin is described, and it is described that the hot-melt composition is obtained by blending 50 to 500 parts by mass of a styrene-based resin and 500 to 2,000 parts by mass of a hydrocarbon-based plasticizer with 100 parts by mass of a styrene thermoplastic elastomer having a mass-average molecular weight of 200,000 to 500,000 and is excellent in heat aging stability, adhesion and easy peel ability, and is suitable as a sealing material of a lighting device of automobiles or the like (see claim 1, paragraphs 0025, 0062). Besides, in examples of the literature, a hot-melt composition is disclosed which includes, with respect to 100 parts by mass of SEEPS, 1,000 parts by mass of a hydrocarbon-based plasticizer and 100 to 500 parts by mass of an aromatic hydrocarbon resin (FMR150 manufactured by Mitsui Chemicals) as the styrene-based resin, or parts by mass of the aromatic hydrocarbon resin and 75 parts by mass of a styrene-vinyltoluene copolymer (ENDEX 155, manufactured by Eastman Chemical Co., Ltd.) (see Table 1 and Table 2). However, the inventors examined the formulations described in Patent Literature 4, and found that the hot-melt compositions described in the literature are not sufficient in sealing property and easy peel ability because of bleeding of the plasticizer, and also does not necessarily meet the market demands in terms of adhesion to a polycarbonate substrate.

In Patent Literature 5, a hot-melt composition which contains SEEPS having a mass-average molecular weight of 150,000 or more, a paraffinic oil having a kinematic viscosity at 40° C. of 100 to 1,000 mm$^2$/s, an aromatic petroleum resin having a softening point of 100° C. or higher, and a non-polar tackifying resin, and is free of a polypropylene wax (see claim 1). Specifically, as a concrete compounding example, hot-melt compositions which contain, per 100 parts by weight of SEEPS having a weight-average molecular weight of 230,000, 800 parts by weight of PW 380 having a kinematic viscosity at 40° C. which is manufactured by Idemitsu Kosan Co., Ltd. as the paraffinic oil, 100 or 200 parts by weight of Endex 155 having a softening point 155° C. which is manufactured by Eastman Chemical Japan Co. Ltd. as the aromatic petroleum resin and 100 parts by weight of Escorz 5320 having a softening point of 120 to 130° C. which is a hydrogenated alicyclic hydrocarbon resin manufactured by ExxonMobil Corp. as the non-polar tackifying resin are described (see Examples 1, 2 and 4). Further, hot-melt compositions in which a part of PW 380 used as the paraffinic oil is replaced by PW 90 (kinematic viscosity at 40° C.: 91 mm$^2$/s) manufactured by Idemitsu Kosan Co., Ltd. a viscosity of which is lower than that of PW 380 are described (see Example 3). However, the present inventors examined the formulations described in the literature, and found that the hot melt-compositions described in the literature are not sufficiently flexible and do not necessarily meet the market demand in terms of adhesion to a polycarbonate substrate.

Patent Literature 6 discloses a hot-melt composition containing SEEPS and a hydrocarbon oil having an aniline point of 135° C. or higher. This literature also discloses that the composition preferably contains SEP and a tackifying resin having a softening point of 120° C. or higher, and the hot-melt composition is used as a sealing material for a lamp (claims 1 to 5). Further, this literature discloses that the hydrocarbon oil having an aniline point of 135° C. or higher may be used in combination with a hydrocarbon oil having an aniline point of less than 135° C. (see paragraph 0047). As a concrete formulation, hot-melt compositions which contains, per 100 parts by weight of SEEPS, 1,300 parts by weight of a paraffinic process oil (Diana process oil PW 380 manufactured by Idemitsu Kosan Co., Ltd., aniline point 142.7° C.) and 700 parts by weight of a tackifying resin (see, e.g. Example 1), or per an elastomer component composed of 100 parts by weight of SEEPS and 60 parts by weight of SEP, 500 parts by weight of Diana process oil PW 380, 400 parts by weight of Diana process oil PW 90, 700 parts by weight of a tackifying resin and 20 parts by weight of Endex 155 (see, e.g. Example 5) are disclosed. Further, the literature discloses a hot-melt composition which contains, per 200 parts by weight of SEEPS, 2,000 parts of a paraffinic process oil (Hicall K350 manufactured by Kaneda Co., Ltd., aniline point 122.4° C.) and an aromatic hydrocarbon resin (FMR 150 manufactured by Mitsi Chemicals Corp., softening point 150° C.) (see Comparative Example 8). The inventors of the present invention examined the formulations described in Patent Literature 6, and found that the hot melt-composition described in Example 1 is not sufficient in adhesion to a polycarbonate substrate, the hot melt-composition described in Example 5 is not sufficient in elongation at a high temperature and adhesion to a polycarbonate substrate, the hot-melt composition described in Comparative Example 8 is poor in easy peel ability because of insufficient oil bleeding resistance and is also insufficient in adhesion to a polycarbonate substrate.

Patent Literature 1: Japanese Patent Laid-Open No. 2001-81277
Patent Literature 2: Japanese Patent Laid-Open No. 2008-127473
Patent Literature 3: Japanese Patent Laid-Open No. 2006-249433
Patent Literature 4: Japanese Patent Laid-Open No. 2011-190287
Patent Literature 5: Japanese Patent Laid-Open No. 2017-179061
Patent Literature 6: Japanese Patent Laid-Open No. 2017-214479

BRIEF SUMMARY OF THE INVENTION

The present invention is completed under the related art mentioned above, and an object of the present invention is to provide a hot-melt composition which is excellent in adhesion and easy peel ability. In addition, another object of the present invention is to provide a sealing material which is excellent in a sealing property and easy peel ability and is suitable for manufacture of a lighting device of an automobile or the like.

As a result of diligent investigations to solve the problems in the prior art, the inventors found that it is effective to use a styrene-based resins having a high softening point and a specific molecular weight as a reinforcing resin for a styrene-based polymer block of a styrene thermoplastic elastomer in a specified proportion with a tackifying resin for a hydrogenated diene polymer block which is used in a specified proportion and a liquid softening agent containing a non-aromatic hydrocarbon-based oil having a high viscosity, and completed the present invention.

Thus, according to the present invention, the following inventions are provided.

(1) A hot-melt composition comprising, with respect to 100 parts by mass of a hydrogenated styrene thermoplastic elastomer having styrene-based polymer blocks at both ends thereof and a hydrogenated diene polymer block at a middle portion and having an a mass-average molecular weight of 250,000-600,000 (A), 150 to 450 parts by mass of an aromatic tackifying resin having a softening point of 135 to 160° C. and a mass-average molecular weight of 500 to 2,500 (B), 100 to 500 parts by mass of a tackifying resin for a hydrogenated diene polymer block which has a softening point of 100 to 160° C. (C), 500 to 1,500 parts by mass of a non-aromatic hydrocarbon oil having a kinematic viscosity of 90 mm$^2$/s or higher at 40° C. (D), wherein 30% by mass or more of the non-aromatic hydrocarbon oil is a non-aromatic hydrocarbon oil having a kinematic viscosity of 300 to 500 mm$^2$/s at 40° C. (D-1).

(2) The hot-melt composition according to the above (1), which has a melt viscosity at 220° C. of 5,000 to 200,000 mPa s and an MFR at 120° C. of less than 200.

(3) The hot-melt composition according to the above (1) or (2), wherein the component (A) is SEEPS.

(4) The hot-melt composition according to any one of the above (1) to (3), wherein the component (B) is a tackifying resin having an iodine value (g/100 g) of 20 or less.

(5) The hot-melt composition according to any one of the above (1) to (4), wherein the component (C) is a hydrogenated alicyclic tackifying resin.

(6) The hot-melt composition according to any one of the above (1) to (5), wherein the component (D) is a paraffinic oil.

(7) The hot-melt composition according to any one of the above (1) to (6), wherein the component (D) contains 30 to 100% by mass of the component (D-1) and 0 to 70% by mass of a hydrocarbon oil having a kinematic viscosity at of less than 300 mm$^2$/s (D-2).

(8) A sealing material comprising the hot-melt composition according to any one of the above (1) to (7).

(9) The sealing material according to the above (8), which has a tensile strength at a tensile elongation of 1,000% at 20° C. of 0.8 kgf/cm$^2$ or lower, a tensile elongation ratio in a range of −20 to 100° C. of 1,000% or higher, an adhesion strength to polycarbonate at 20° C. of 1.5 kgf/cm² or higher and an amount of bleeding oil measured after being kept still at 80° C. for 24 hours in a 50% compressed state of less than 60 mg.

(10) The sealing material according to the above (8) or (9), which is used for a lamp of an automobile.

Effect of the Invention

According to the present invention, it is possible to obtain a hot-melt composition which is balanced between adhesion to a substrate and easy peel ability and is excellent in heat resistance and weather resistance. In addition, by using the composition, a sealing material which is balanced between sealing property and easy peel ability and is suitable for production of automobile lamps.

DETAILED DESCRIPTION OF THE INVENTION

Embodiments of the present invention are described in detail below, but the present invention is not limited to the embodiments. In addition, constituent elements in the following embodiments include constituent elements which can be easily assumed by those skilled in the art or the constituent elements which are substantially the same.

The hot-melt composition of the present invention comprises, as essential components, a hydrogenated styrene thermoplastic elastomer having styrene-based polymer blocks at both ends and a hydrogenated diene polymer block at a middle portion and having an a mass-average molecular weight (Mw) of 250,000 to 600,000 (A), an aromatic tackifying resin having a softening point of 135 to 160° C. and a mass-average molecular weight of 500 to 2,500 (B), a tackifying resin for a hydrogenated diene polymer block which has a softening point of 100 to 160° C. (C), a non-aromatic hydrocarbon oil having a kinematic viscosity at 40° C. of 90 mm²/s or higher. The component (D) contains at least 30% by mass of a non-aromatic hydrocarbon oil having a kinematic viscosity at 40° C. of 300 to 500 mm²/s (D-1).

<Hydrogenated Styrene Thermoplastic Elastomer>

In the present invention, the hydrogenated styrene thermoplastic elastomer used as the component (A) has styrene-based polymer blocks at both ends and a hydrogenated diene polymer block at the middle portion, and has a mass-average molecular weight (Mw) of 250,000 to 600,000. In the present invention, the mass-average molecular weight of the hydrogenated styrene thermoplastic elastomer is an important requirement; if the value is too small, heat resistance as a sealing material will be lacking, and in contrast, if the value is too high, a melt viscosity at the time of being used as a hot-melt adhesive becomes high and the discharge workability becomes deteriorated. The mass-average molecular weight is preferably 300,000 to 600,000, and more preferably 400,000 to 550,000.

In the present invention, the mass average molecular weight of the hydrogenated styrene thermoplastic elastomer is a value in terms of a polystyrene standard based on a value measured by gel permeation chromatography (GPC) using tetrahydrofuran (THF) as a solvent.

The hydrogenated styrene thermoplastic elastomer is an A-B-A type triblock polymer consisting of (styrene-based polymer block)-(hydrogenated diene-based polymer block)-(styrene-based polymer block) and can be obtained by selectively hydrogenating a diene-based polymer block (block B') of an A-B'-A type (A represents a styrene-based polymer block, and B' represents a diene-based polymer block) triblock copolymer using a known method. A monomer used for producing the styrene-based polymer block (block A) is an aromatic vinyl compound, and specific examples of the monomer include styrene, α-methylstyrene, vinyltoluene, isopropenyltoluene and the like. In particular, styrene is most often used. In addition, a monomer used for producing the diene polymer block (block B') is a conjugated diene having 4 to 5 carbon atoms, and specific examples of the monomer include 1,3-butadiene, isoprene, 1,3-pentadiene and the like. In particular, 1,3-butadiene, isoprene or a mixture thereof is preferably used.

The hydrogenated styrene thermoplastic elastomer preferably has 10 to 50% by mass of the styrene-based polymer blocks and 90 to 50% by mass of the hydrogenated diene polymer block in order to balance adhesion and easy peel ability, and particularly preferably has 20 to 40% by mass of the styrene-based polymer blocks and 80 to 60% by mass of the hydrogenated diene polymer block. In addition, the styrene-based polymer blocks at both ends usually have substantially the same molecular weight, but they do not have to be the same.

The hydrogenated diene polymer block (block B) which is present between the two styrene-based polymer blocks is obtained by hydrogenating carbon-carbon double bonds contained in a diene polymer. Unsaturation bonds are reduced as a hydrogenation rate increases, and as a result, thermal stability or weather resistance of the polymer is improved. On the other hand, since complete hydrogenation involves manufacturing difficulties, it is sufficient that at least 50% or more, preferably 70% or more of the carbon-carbon double bonds is hydrogenated.

Specific examples of the hydrogenated styrene thermoplastic elastomer include SEBS which is a hydrogenated product of a styrene-butadiene-styrene triblock copolymer (SBS), SEPS which is a hydrogenated product of a styrene-isoprene-styrene triblock copolymer (SIS), SEEPS which is a hydrogenated product of a styrene-isoprene/butadiene-styrene triblock copolymer (SIBS), and the like. Specific examples of the SEPS include Septon 2005 (styrene content 20% by mass, manufactured by Kuraray Co., Ltd.), Septon 2006 (styrene content 35% by mass, manufactured by Kuraray Co., Ltd.) and the like, specific examples of the SEBS include Kraton G1651 (styrene content 33% by mass, manufactured by Kraton Polymer Co., Ltd.), Septon 8006 (styrene content 33% by mass, manufactured by Kuraray Co., Ltd.), and the like, and specific examples of the SEEPS include Septon 4055 (styrene content 30% by mass, manufactured by Kuraray Co., Ltd.), Septon 4077 (styrene content 30% by mass, manufactured by Kuraray Co., Ltd.), Septon 4099 (styrene content 30% by mass, manufactured by Kuraray Co., Ltd.), and the like. In particular, the SEEPS is preferably used because of having an ability to retain the non-aromatic hydrocarbon oil and a high tensile strength. Therefore, the hydrogenated styrene thermoplastic elastomer used as the component (A) preferably contains 50% by mass or more, more preferably 80% by mass or more of the SEEPS, particularly preferably contains the SEEPS only. The hydrogenated butadiene-isoprene copolymer which forms an intermediate block of the SEEPS usually has 10 to 90% by mass, preferably 30 to 70% by mass of butadiene-derived units, and 90 to 10% by mass, preferably 70 to 30% by mass of isoprene-derived units.

In addition, the hydrogenated styrene thermoplastic elastomer may be modified with a polar compound such as maleic anhydride, acrylic acid, methacrylic acid, a hydroxy group-containing compound, a phenol compound or the like, and may be an A-B-A-B-A type copolymer (A represents a styrene-based polymer block, B represents a hydrogenated diene-based polymer block) which also has a styrene-based polymer block at the middle portion in addition to the styrene-based polymer blocks at both ends.

<Aromatic Tackifying Resin>

In the present invention, the aromatic tackifying resin is used as the component (B). A softening point of this resin needs to be 135 to 160° C., and a preferred softening point is 140 to 160° C. If the softening point is below the lower limit, heat resistance becomes insufficient, and in contrast, if the softening point is higher than the upper limit, a softening point of the composition is increased, and a coating temperature when the composition is used as a hot-melt adhesive must be increased, resulting in energy efficiency reduction and composition deterioration due to heat during coating. Here, the mass-average molecular weight of the aromatic tackifying resin needs to be 500 to 2,500, preferably 700 to 2,200, particular preferably 1,000 to 2,000. If the mass-average molecular weight is below the lower limit, heat resistance becomes insufficient, and in contrast, if the mass-average molecular weight is higher than the upper limit, workability and flexibility becomes insufficient. Note that, mass-average molecular weight of the aromatic tackifying resin is a value in terms of polystyrene standard based on a measured value by gel permeation chromatography (GPC) using tetrahydrofuran (THF) as a solvent in the same manner as in the case of the hydrogenated styrene thermoplastic elastomer.

The aromatic tackifying resin that is used is an addition polymer of an aromatic monomer having an ethylenic carbon-carbon double bond, such as styrene, α-methylstyrene, vinyltoluene, isopropenyl toluene, indene, or the like. The aromatic tackifying resin may be a homopolymer of the above monomer or a copolymer of two or more monomers mentioned above which are appropriately combined, and may be obtained by performing copolymerization taking a polymerizable component other than the aromatic compounds, for example, an aliphatic olefin having five carbon atoms such as isoprene, 1,3-pentadiene, 2-methyl-2-butene or the like, and an alicyclic olefin such as dicyclopentadiene, terpene, pinene, dipentene or the like, as a subsidiary component. Furthermore, the aromatic tackifying resin may be modified with a phenol compound or maleic anhydride, acrylic acid, methacrylic acid or the like. Also, the aromatic tackifying resin may be a C9-based petroleum resin obtained by polymerizing a C9 fraction containing the aromatic monomers as described above.

Specific examples of the aromatic tackifying resin include FMR 0150 (softening point 145° C., mass average molecular weight 1,650, Mitsui Chemicals, Inc.), Petcoal 140HM (softening point 140° C., mass average molecular weight 800, Tosoh Corp.), and the like.

When a hot-melt composition having good weather resistance and little coloration is required, it is desirable to use an aromatic tackiying resin that does not contain an ethylenically unsaturated double bond. From such a viewpoint, the aromatic tackiying resin preferably has an iodine value (g/100 g) of 20 or less, particularly 15 or less. As an aromatic tackifying resin having a small iodine value, a homopolymer or copolymer mainly composed of an aromatic vinyl compound such as styrene, α-methylstyrene, vinyl toluene and isopropenyl toluene is exemplified, and a homopolymer or copolymer containing styrene or α-methylstyrene as a main component is preferably used because of excellent weather resistance. Specific examples of such polymers include, for example, FMR 0150 manufactured by Mitsui Chemicals Inc.

The aromatic tackifying resin used as the component (B) may be a single resin or a mixture of two or more resins used in combination as necessary. The amount of the component (B) is 150 to 450 parts by mass, preferably 200 to 350 parts by mass with respect to 100 parts by mass of the component (A). When the content of the component (B) is excessively small, heat resistance is insufficient. In contrast, when the content of the component (B) is excessively large, there is a problem that flexibility of the composition is lowered and easy peel ability is impaired. The amount of the component (B) used is preferably 500 to 1,500 parts by mass, particularly 650 to 1,200 parts by mass based on 100 parts by mass of the aromatic polymer blocks in the component (A).

<Tackifying Resin for Hydrogenated Diene Polymer Block>

In the present invention, a tackifying resin for a hydrogenated diene polymer block is used as the component (C). The tackifying resin is a resin which is compatible with the hydrogenated diene polymer block contained in the component (A), and has a softening point of 100 to 160° C., preferably 120 to 160° C., and particularly preferably 130 to 160° C. If the softening point is lower than the lower limit, heat resistance becomes insufficient, and in contrast, if the softening point is higher than the upper limit, flexibility is lowered and easy peel ability is impaired.

The tackifying resin that is used is not particularly limited as long as it can be compatible with a hydrogenated product of the diene-based polymer such as polybutadiene, polyisoprene, butadiene-isoprene copolymer, and the like and can impart tackiness, and specific examples of the tackifying resin include, for example, rosin-based resins such as gum rosin, tall oil rosin, wood rosin, hydrogenated rosin, disproportionated rosin, polymerized rosin, maleated rosin, rosin glycerin ester, hydrogenated rosin glycerin ester and the like; alicyclic resins such as terpene resins which include a terpen resin composed of mainly α-pinene, a terpen resin composed of mainly β-pinene, a terpen resin composed of mainly dipentene or the like, a hydrogenated terpene resin, an aromatic hydrocarbon-modified terpene resin, a hydrogenated aromatic hydrocarbon-modified terpene resin, a terpene phenol copolymer resin, a hydrogenated terpene phenol copolymer resin, a dicyclopentadiene-based resin, a hydrogenated dicyclopentadiene-based resin, and the like; aliphatic hydrocarbon resins such as a C5-based hydrocarbon resin, a hydrogenated C5-based hydrocarbon resin, a C5/C9-based hydrocarbon resin, a hydrogenated C5/C9-based hydrocarbon resin; a hydrogenated C9-based hydrocarbon resin in which at least 50% of aromatic rings is hydrogenated; and the like.

Among these tackifying resins, resins in which unsaturated bonds are reduced by hydrogenation are preferably used because of being excellent in heat resistance, weather resistance, hue, odor and the like. In particular, a hydrogenated alicyclic resin such as Aimarb P140 (manufactured by Idemitsu Kosan Co., Ltd., softening point 140° C.), Escorez 5340 (manufactured by ExxonMobil Corp., softening point 140° C.), Alcon P140 (manufactured by Arakawa Chemical Co., Ltd., softening point 140° C.), Aimarb P125 (manufactured by Idemitsu Kosan Co., Ltd., a softening point 125° C.), Alcon P125 (manufactured by Arakawa Chemical Co., Ltd., softening point 125° C.), Regalite R1125 (manufactured by Eastman Chemical Co., Ltd., softening point 125° C.), Escorez 5320 (manufactured by ExxonMobil Corp., softening point 120° C.) is preferable in terms of compatibility with the hydrogenated diene polymer block.

The tackifying resin used as the component (C) may be a single resin, or may be obtained by appropriately using two or more resins in combination as necessary. A usage amount of the component (C) is 100 to 500 parts by mass, and preferably 200 to 450 parts by mass with respect to 100 parts by mass of the component (A). If the content of the component (C) is excessively small, increase of the melt viscosity or reduction in the flexibility is caused, and in contrast, if the content is excessively large, the adhesion is lowered. In addition, the usage amount of the component (C) is preferably 140 to 700 parts by mass, and particularly preferably 250 to 600 parts by mass with respect to 100 parts by mass of the hydrogenated diene polymer block in the component (A).

<Non-Aromatic Hydrocarbon Oil>

In the present invention, a non-aromatic hydrocarbon oil having a kinematic viscosity at 40° C. of 90 mm$^2$/s or more is used as the component (D). Here, the term "non-aromatic hydrocarbon oil" means a hydrocarbon oil substantially containing no aromatic component. When a large amount of an aromatic compound is contained in an oil component like an aromatic hydrocarbon oil, the aromatic compound is incorporated into the styrene block of the styrene thermoplastic elastomer. Consequently, heat resistance is impaired. Therefore, the aromatic hydrocarbon oil is excluded from the component (D). However, in the case that the oil component contains a small amount of an aromatic compound as seen in a naphthenic hydrocarbon oil, the oil may component contain a small amount of an aromatic compound as long as the effects of the present invention are not essentially impaired. In such a case, an upper limit of a content of the aromatic compound is 5% by mass or less, particularly 2% by mass or less.

The non-aromatic hydrocarbon oil is blended to adjust a viscosity of the composition and impart flexibility, and is used in a proportion of 500 to 1,500 parts by mass, preferably 700 to 1,200 parts by mass with respect to 100 parts by mass of the component (A). If a blending amount of the non-aromatic hydrocarbon oil is too small, flexibility is impaired, and in contrast, if the blending amount is too large, heat resistance is lowered. The non-aromatic hydrocarbon oil needs to have a kinematic viscosity at 40° C. of 90 mm$^2$/s or more. When an oil having a kinematic viscosity below the value is used, an effect of lowering a melt viscosity of the composition is achieved, but bleeding of the oil is easily generated, and sealability and easy peel ability are not sufficient. An upper limit of a kinematic viscosity at 40° C. of the non-aromatic hydrocarbon oil is preferably 500 mm$^2$/s or less.

The non-aromatic hydrocarbon oil may be used alone or in appropriate combinations as required. The component (D) is required to contain a non-aromatic hydrocarbon oil having a kinematic viscosity at 40° C. of 300 to 500 mm$^2$/s (D-1). A ratio of the component (D-1) in the component (D) is 30% by mass or more, preferably 40% by mass or more, particularly preferably 50% by mass or more. When the (D-1) component is not included, heat resistance cannot be sufficiently improved, and bleeding of the oil is apt to be generated. On the other hand, when the component (D) is composed of only the (D-1) component, a melt viscosity of the composition tends to increase, and sufficient flexibility can be hardly obtained. In such a case, a non-aromatic hydrocarbon oil having a kinematic viscosity at 40° C. of 90 to less than 300 mm$^2$/s (D-2) may be used as a part of the component (D) to solve the defects mentioned above. With respect to a ratio of the (D-1) component and the (D-2) component, the (D-1) component is 30 to 95% by mass, preferably 40 to 90% by mass, more preferably 50 to 90% by mass based on the total amount of both components, and the (D-2) component is 70 to 5% by mass, preferably 60 to 10% by mass, and more preferably 50 to 10% by mass. The (D-2) component is preferably a non-aromatic hydrocarbon oil having a kinematic viscosity at of 90 to 200 mm$^2$/s.

The non-aromatic process oil used as the component (D-1) can be used without particular limitation as long as it has the above kinematic viscosity and is conventionally used for a hot-melt composition having a styrene thermoplastic elastomer as a base polymer. Specific examples of the non-aromatic hydrocarbon oil include, for example, a paraffinic or naphthenic process oil; a liquid polymer such as liquid polybutene, liquid polybutadiene, liquid polyisoprene or the like; a hydrocarbon oil such as liquid paraffin, olefin process oil or the like; and the like.

Specific examples of commercially available products include a paraffinic process oil such as Diana Process Oil PW-380 manufactured by Idemitsu Kosan Co., Ltd. (kinematic viscosity at 40° C.: 380 mm$^2$/s), KP6025 manufactured by Henan Runhua Chemicals Co., Ltd. (kinematic viscosity at 40° C.: 394 mm$^2$/s), KP 6030 manufactured by Henan Runhua Chemicals Co., Ltd. (kinematic viscosity at 40° C.: 466 mm$^2$/s); a liquid hydrocarbon polymer such as Lucant HC-40 manufactured by Mitsui Chemicals Inc. (kinematic viscosity at 40° C.: 380 mm$^2$/s), Durasyn 174 manufactured by INEOS Capital Ltd. (kinematic viscosity at 40° C.: 380 to 430 mm$^2$/s): SpectralSYN 40 manufactured by ExxonMobil Corp. (kinematic viscosity at 40° C.: 396 mm$^2$/s), and the like. In particular, the paraffinic process oil is preferably used in terms of compatibility with a base polymer and heat resistance.

The non-aromatic hydrocarbon oil used as the (D-2) component can be used without particular limitation as long as it has a kinematic viscosity at 40° C. of 90 mm$^2$/s or more and less than 300 mm$^2$/s and is conventionally used for a hot-melt composition having a styrene thermoplastic elastomer as a base polymer. Specific examples thereof include, for example, a paraffinic or naphthenic process oil; a liquid polymer such as liquid polybutene, liquid polybutadiene, liquid polyisoprene or the like; a hydrocarbon oil such as liquid paraffin, olefin process oil or the like; and the like. Especially, a paraffinic or naphthenic process oil is preferable, and particularly, the paraffinic process oil is preferably used. Specific examples of the paraffinic process oil include Diana Process Oil PW90 (kinematic viscosity at 40° C.; 96 mm$^2$/s) manufactured by Idemitsu Kosan Co., Ltd., Sunpure P100 (kinematic viscosity at 40° C.; 96 mm$^2$/s) manufactured by Japan Sun Oil Co., Ltd. and Sunpure LW 500 (kinematic viscosity at 40° C.; 99 mm$^2$/s) manufactured by Japan Sun Oil Co., Ltd.

<Other Blending Agents>

In the present invention, in addition to the above components (A) to (D), an elastomer component other than the styrene thermoplastic elastomer described as the component (A) which is usually used in the technical field of hot-melt compositions having a styrene thermoplastic elastomer as a base polymer and a blending agent such as an antioxidant, an UV absorber, a filler, a silane coupling agent, a pigment, a dye, an antistatic agent, a flame retardant, a stabilizer, a solvent, an antifoaming agent or the like can be blended as necessary.

The elastomer component other than the component (A) may be a hydrogenated A-B-A type styrene thermoplastic elastomer having a mass-average molecular weight of less than 250,000, an A-B'-A type styrene thermoplastic elastomer in which a diene polymer block is not hydrogenated, an A-B type styrene thermoplastic elastomer, an A-B' type styrene thermoplastic elastomer in which a diene polymer block is not hydrogenated, or the like. These components may be included in a form of substituting a part of the component (A) in a range where the effects of the present invention are not essentially disturbed; however, if the amount increases, heat resistance or weather resistance becomes inferior, and thus the amount is preferably 40% by mass or less, more preferably 20% by mass or less of the whole elastomer component that constitutes a base polymer, and particularly, it is most preferable that these components are not contained in the base elastomer component. Particularly, when the A-B type or the A-B' type styrene thermoplastic elastomer is contained in the component, heat resistance is easily lowered. Therefore, it is preferable that these diblock polymers are not essentially contained. When a part of the component (A) is replaced by any other elastomers as described above, an amount of the whole elastomer component including the other elastomer or elastomers is treated as 100 parts by mass of component (A) which is a standard for the ratio to each the component (B), (C) and (D).

A primary antioxidant may be a naphthylamine-based antioxidant, a p-phenylenediamine-based antioxidant, a quinoline-based antioxidant, a phenol-based antioxidant, a hindered phenol-based antioxidant, a hindered amine-based antioxidant or the like, and in particular, the hindered phenol-based antioxidant is preferably used. A secondary antioxidant may be a phosphite-based antioxidant, a thioether-based antioxidant, a hydroxylamine-based antioxidant or the like, and in particular, the phosphite-based antioxidant is preferably used. From the viewpoint of an antioxidant effect and thermal stability of the composition, a content of each the primary antioxidant and the secondary antioxidant is preferably 1 to 30 parts by mass, and particularly preferably 2 to 20 parts by mass with respect to 100 parts by mass of the component (A).

The UV absorber may be a benzotriazole-based absorber, a triazine-based absorber, a benzophenone-based absorber, a cyanoacrylate-based absorber or the like, and in particular, the benzotriazole-based absorber is preferably used. From the viewpoint of the weather resistance of the composition, a content of the UV absorber is preferably 1 to 30 parts by mass, and particularly preferably 2 to 20 parts by mass with respect to 100 parts by mass of the component (A). A conventionally well-known filler can be used as the filler, and an inorganic or organic filler of various shapes can be mentioned. By blending the filler, a cured product can be strengthened, and can exhibit excellent adhesion to, for example, mortar, metal and the like. The inorganic filler may be, for example, calcium carbonate, zinc oxide, glass beads, titanium oxide, alumina, carbon black, clay, ferrite, talc, mica powder, aerosil, silica, an inorganic fiber such as a glass fiber and an inorganic foam. The organic filler may be a powder of a thermosetting resin such as an epoxy resin, carbon fiber, synthetic fiber, synthetic pulp or the like.

The silane coupling agent may be, for example, trimethoxyvinyl silane, γ-glycidoxypropyltrimethoxy silane or the like. When these silane coupling agents are blended, an effect of improving adhesion to a wet surface can be obtained. The pigment may be an inorganic pigment such as titanium oxide, zinc oxide, ultramarine, bengara, lithopone, lead, cadmium, iron, cobalt, aluminum, hydrochloride, sulfate or the like; or an organic pigment such as Neozapon Black RE, Neo Black RE, Orasol Black CN, Orasol Black Ba (all manufactured by Ciba Geigy), Spilon Blue 2BH (manufactured by Hodogaya Chemical Co., Ltd.) or the like, and these pigments can be used in appropriate combination as necessary.

A black dye, a yellow dye, a red dye, a blue dye, a brown dye, and the like are appropriately selected and used as the dye depending on the color required for the product. The antistatic agent may be, for example, a hydrophilic compound such as a quaternary ammonium salt, a polyglycol, an ethylene oxide derivative or the like. The flame retardant may be, for example, chloroalkyl phosphate, dimethyl/methyl phosphate, bromine/phosphorus compound, ammonium polyphosphate, neopentyl bromide-polyether, or brominated polyether. The stabilizer may be, for example, a fatty acid silyl ester, a fatty acid amide trimethylsilyl compound or the like. The antifoaming agent may be, for example, calcium oxide, magnesium oxide, molecular sieve.

A method for producing the hot-melt composition of the present invention is not particularly limited, and the hot-melt composition can be produced by a conventionally known method. For example, each of the components (A) to (D) and other components to be blended as required are put into a kneader heated near a temperature at which these components can be melted. These components are sufficiently melted and mixed, and thereby the hot-melt composition can be obtained. The kneader may be, for example, a Banbury mixer equipped with a heating device and a defoaming device, a pressurized kneader, a Henschel mixer, a Brabender kneader, or a disperser. The inside of the kneader can be depressurized as necessary. The obtained hot-melt composition can be filled and stored in, for example, a mold release box, a pail can, or a drum can.

A softening point of the hot-melt composition of the present invention is usually 130 to 240° C., and preferably 150 to 200° C. If the softening point is too low, heat resistance is insufficient, and in contrast, if the softening point is too high, operation for melting becomes difficult. A melt viscosity of the hot-melt composition changes depending on a measurement temperature. In the view of operability upon coating, a melt viscosity at 220° C. is preferably 5,000 to 200,000 mPa·s, particularly preferably 10,000 to 150,000 mPa·s.

Substrates to which the hot-melt composition of the present invention is applied, that is, a member for adhesion and an adherend are not particularly limited. For example, the substrate may be polyolefins such as polyethylene, polypropylene, polybutene and polystyrene; engineering plastics such as polycarbonate, polyester, polyamide and polyacetal; metal, glass and rubber.

The application of the hot-melt composition of the present invention is not particularly limited, and for example, the hot-melt composition can be used for applications such as automobiles or vehicles (bullet trains, trains), electrical products, building materials, woodwork, bookbinding packaging, and the like. Applications related to automobiles may be adhesion of interior materials such as ceilings, doors, and seats, adhesion or sealing of exterior materials such as automobile lighting device like lamps, side moldings, and the like. Specifically, the hot-melt composition can be suitably used to adhere and seal a plastic housing which holds a light source and a lens which protects the light source during the manufacturing of the automobile lighting device. In addition, electrical-related applications may be assembly of a lamp shade, a speaker, and the like. Furthermore, applications related to building materials or woodwork may be adhesion of doors, access floors, multi-layer floors, furniture assembly, edge bonding, profile wrapping or the like in construction sites or in factories of manufacturing building materials.

<Sealing Material>

The sealing material of the present invention is obtained by using the above hot-melt composition, and is generally referred to as a gasket, packing, sealing, caulking, putty or the like. The shape of the sealing material is not particularly limited. The sealing material may have any shape such as a pellet shape, a powder shape, a string shape, a belt shape or the like.

In terms of achieving both adhesion between the members and easy peel ability, preferably, a tensile strength of the sealing material at a tensile elongation of 1,000% at 20° C. is 0.8 kgf/cm$^2$ or lower, furthermore 0.6 kgf/cm$^2$ or lower, and particularly 0.5 kgf/cm$^2$ or lower, and a tensile elongation ratio in a range of −20 to 100° C. is 1,000% or higher, particularly 1,200% or higher. Furthermore, recently, there are increasing occasions in which a member of polyolefin typified by polypropylene and a member made of polycarbonate are adhered with a hot-melt adhesive, and thus it is appropriate for ensuring sealing property that an adhesion strength to polycarbonate (PC) at 20° C. is 1.5 kgf/cm$^2$ or higher, and particularly 2.0 kgf/cm$^2$ or higher.

A sealing method using the sealing material of the present invention is not particularly limited and may be carried out according to a conventional method. For example, when an automobile lamp housing is mounted using a hot-melt type sealing material, the mounting can be carried out as follows.

The hot-melt composition is usually heat-coated automatically or manually to a member surface requiring sealing by using a heat-coating device called an applicator. The heat-coating device is a device which can suck a given amount of a molten hot-melt composition with a gear pump or the like, and is used by appropriately heating in accordance with the softening point of the hot-melt composition. The coating shape of the hot-melt composition is not particularly limited, and usually, the hot-melt composition is heat-coated to a member to be sealed such as a lamp housing surface. Thereafter, another member is brought into contact with the member to which the hot-melt composition is applied and mechanically tightened, thereby forming the lamp housing in which an adhered surface is sealed.

In addition to the method of forming a loop shape by heat-coating to the lamp housing surface of the automobile, a loop-shaped gasket required for maintaining the automobile lamp in water-tightness can be made in advance and then applied to the lamp housing surface automatically or manually. This gasket can be made by preparing a release paper, a release film made of polytetrafluoroethylene, or the like, and heat-coating the hot-melt composition into a predetermined shape thereon.

When it becomes necessary to replace an assembled lamp housing, or when it becomes necessary to disassemble the product after use and separate it into a lens and a housing, the following can be performed. Since the sealing material of the present invention is excellent in easy peel ability, the lens and the housing can be easily detached by just releasing restraint of mechanically tightened parts without using a detachment tool such as an industrial dryer for reducing a viscosity of the sealing material by heating, a plastic crowbar or the like which is conventionally used.

In this case, the sealing material used in a gap between the lens and the housing is adhered to each contact surface, but cohesive force of the sealing material is larger than adhesive force, and thus interfacial peeling is resulted, and a residual of the sealing material can be easily peeled without remaining on the contact surfaces. As described above, when the sealing material of the present invention is used, the lens and the housing can be easily detached without requiring a special disassembling tool or the like as in the case of using the molded gasket.

Accordingly, the hot-melt composition of the present invention has excellent performance in terms of having heat resistance, adhesion to the substrates and flexibility. In addition, the sealing material prepared from the hot-melt composition is excellent in having both sealing property between the members and easy peel ability and having excellent heat resistance.

EXAMPLES

The present invention will be described below more specifically with reference to examples, but the present invention is not limited to these examples. Moreover, "parts" and "%" in the examples and comparative examples are based on mass unless otherwise specified. In addition, an evaluation method of physical properties of hot-melt compositions is as follows.

(1) Mass-average molecular weight of the hydrogenated styrene thermoplastic elastomer and the aromatic tackifying resin: The mass average molecular weight is a value in terms of polystyrene standard based on a measured value by gel permeation chromatography (GPC) using tetrahydrofuran (THF) as a solvent.

(2) Iodine value (g/100 g) of the tackifying resin: The iodine value is measured according to "Chemical Product-Iodine Value Test Method-Electro Titration" JIS K-0070.

(3) Softening point of the tackifying resin and the hot-melt composition: The softening point is measured according to JAI-7-1997.

(4) Melt viscosity: The melt viscosity is measured at 220° C. using an automatic viscometer manufactured by Brookfield (model: BROOKFIELD DV-II+Pro). Spindle No. of the automatic viscometer used for the measurement is No. 29, and the rotation speed is set to 5 rpm.

(5) Melt flow rate (MFR): The melt flow rate is measured at 120° C. using a melt indexer (model: P-111 manufactured by Toyo Seiki Seisaku-Sho Co., Ltd.). The pressure condition is set to 2.16 kg.

(6) Tensile strength: The hot-melt sealing material is processed into a test piece having a size of 10 mm×50 mm×2 mm, and then the test piece is pulled at a speed of 500 mm/min in an environment of −20° C., 20° C. and 100° C., and the strengths (kgf/cm$^2$) at a tensile elongation of 500% and 1,000% are measured.

(7) Elongation of the hot-melt composition: The elongation ratio (%) when the test piece is broken in the tensile strength measurement of the above (6) is measured.

(8) Adhesion and adhesive force to polycarbonate: A hot-melt composition is processed into a piece having a size of 10 mm×10 mm×3 mm and the piece is clamped between two plates each of which has a size of 25 mm×50 mm×3 mm and is made of a polycarbonate plate (PC1600 manufactured by C.I.Takiron Corp.), and then the piece is compressed until its thickness is reduced by 50% (compressed from 3 mm to 1.5 mm). After being kept still at room temperature for 72 hours, the compression is released, and a test piece is obtained when 24 hours elapse after the release of the compression. Under an environment of 20° C., one plate of the test piece is pulled at a speed of 50 mm/min, and an adhesion strength when the plate is peeled off is measured. Evaluation is performed in the following four stages based on the adhesion strength.
◎(Excellent): 2.0 kgf/cm² or higher
○(Good): 1.5 kgf/cm² or higher and less than 2.0 kgf/cm²
Δ(Fair): 1.0 kgf/cm² or higher and less than 1.5 kgf/cm²
x(Poor): less than 1.0 kgf/cm²
(9) Heat sagging resistance: A hot-melt composition processed into a piece of 10 mm square cube is adhered to an aluminum plate and kept still at 140° C. to observe a shape change after 72 hours, and a degree of the shape change is evaluated in the following four stages.
◎(Excellent): No change in shape
○(Good): Slight deformation
Δ(Fair): partial flow
x(Poor): complete flow
(10) Flexibility: A strength at 1,000% tensile at 20° C. in the above (6) is evaluated in the following four stages.
◎(Excellent): 0.5 kgf/cm² or lower
○(Good): more than 0.5 kgf/cm² and 0.8 kgf/cm² or lower
Δ(Fair): more than 0.8 kgf/cm² and 1.2 kgf/cm² or lower
x(Poor): more than 1.2 kgf/cm²
(11) Oil bleeding: A cylinder having a height of 20 mm and a diameter of 27 mm is formed by using a hot-melt composition, and the cylinder is wrapped with a square paper having a basis weight of 70 g/m². The cylinder is kept still at 80° C. for 24 hours in a 50% compressed state. After releasing the compression, a weight change per a piece of the square paper is measured to determine an amount of an oil bleeding. Bleeding resistance is evaluated in the following three stages based on the oil bleeding amount.
◎(Excellent): 50 mg or less
○(Good): more than 50 mg to less than 60 mg
x(Poor): 60 mg or more Example 1

A hot-melt composition, which includes 100 parts of SEEPS (Septon4099, mass-average molecular weight 500,000, styrene content 30%, manufactured by Kuraray Co., Ltd.) as the component (A), 200 parts of FMR0150 manufactured by Mitsi Chemicals Corp. (copolymer of styrene and an aromatic monomer, softening point 145° C., mass-average molecular weight 1,650, iodine value 6 or less) as the component (B), 200 parts of Aimarb P140 manufactured by Idemitsu Kosan Co., Ltd. (hydrogenated alicyclic tackifying resin, softening point 140° C.) as the component (C), 400 parts of a paraffinic process oil (Diana process oil PW380 manufactured by Idemitsu Kosan Co., Ltd., kinematic viscosity at 40° C.: 380 mm²/s)(D-1) and 400 parts of a paraffinic process oil (Diana process oil PW90 manufactured by Idemitsu Kosan Co., Ltd. kinematic viscosity at 40° C.: 96 mm²/s) (D-2) as the component (D), 5 parts of Irganox 1010 (manufactured by BASF) as the primary antioxidant and 5 parts of Tinuvin326 (manufactured by BASF) as the UV absorber, was prepared by mixing and heating each component. For the obtained composition, fluidity, heat resistance, flexibility, elongation, adhesion to polycarbonate, heat sagging resistance and oil bleeding amount were measured. The results are shown in Table 1.

Examples 2 to 6 and Comparative Examples 1 to 7

A hot-melt composition was prepared in a way similar to Example 1 except that compositions of the components (A) to (D) are changed to those shown in Table 1, and the obtained composition was evaluated in a way similar to Example 1. The results are shown in Table 1 and Table 2.

Materials used in Examples 2 to 6 and Comparative examples 1 to 7 are as follows.

Petcoal 140HM: C9-based petroleum resin, softening point 140° C., mass-average molecular weight 800, iodine value 67, manufactured by Tosoh Corp. Sylvares SA140: α-methylstyrene polymer, softening point 140° C. mass-average molecular weight 4,200, iodine value 4 or less, manufactured by Arizona Chemical.

FTR 8120: Styrene polymer, softening point of 125° C., mass-average molecular weight of 1,500, iodine value 13 or less, manufactured by Mitsui Chemicals Corp.

TABLE 1

| Ingredient (parts) | | Example | | | | | |
|---|---|---|---|---|---|---|---|
| | | 1 | 2 | 3 | 4 | 5 | 6 |
| A | Septon 4099 | 100 | 100 | 100 | 100 | 100 | 100 |
| B | FMR 0150 | 200 | 300 | 400 | | 200 | 400 |
| B | Petcoal 140HM | | | | 300 | | |
| C | Aimarb P140 | 200 | 200 | 200 | 200 | 300 | 200 |
| D-2 | PW-90 | 400 | 400 | 400 | 400 | 400 | |
| D-1 | PW-380 | 400 | 400 | 400 | 400 | 400 | 800 |
| Total (parts) | | 1300 | 1400 | 1500 | 1400 | 1400 | 1500 |
| Melt viscosity (mPa · s) | | 148000 | 41600 | 11400 | 56500 | 114400 | 37400 |
| MFR (g/10 min) | | 51 | 58 | 97 | 33 | 93 | 19 |
| Tensile strength at 100° C. (kgf/cm²) | 500% | 0.21 | 0.21 | 0.24 | 0.18 | 0.10 | 0.23 |
| | 1000% | 0.34 | 0.36 | 0.40 | 0.30 | 0.17 | 0.33 |
| Tensile strength at 20° C. (kgf/cm²) | 500% | 0.12 | 0.12 | 0.18 | 0.14 | 0.09 | 0.19 |
| | 1000% | 0.21 | 0.23 | 0.93 | 0.28 | 0.25 | 0.86 |
| Elongation (%) | 100° C. | 2200 | 2200 | 2200 | 2200 | 2200 | 2200 |
| | 20° C. | 2200 | 2100 | 1900 | 2200 | 2200 | 2000 |
| | −20° C. | 1200 | 1200 | 1000 | 1000 | 1000 | 1000 |
| Adhesion strength (PC/PC) (kgf/cm²) | | 1.6 | 2.9 | 3.2 | 2.2 | 1.5 | 5.5 |
| Heat sagging resistance | | ◎ | ◎ | ○ | ◎ | ◎ | ◎ |
| Bleeding oil amount (mg) | | 58 | 49 | 44 | 51 | 49 | 41 |

TABLE 1-continued

| | Example | | | | | |
|---|---|---|---|---|---|---|
| Ingredient (parts) | 1 | 2 | 3 | 4 | 5 | 6 |
| Evaluation of properties | | | | | | |
| Fludity | ◎ | ◎ | ◎ | ◎ | ◎ | ◎ |
| Heat resistance | ◎ | ◎ | ◎ | ◎ | ◎ | ◎ |
| | ◎ | ◎ | ○ | ◎ | ◎ | ◎ |
| Flexibility | ◎ | ◎ | Δ | ○ | ◎ | Δ |
| Elongayion | ◎ | ◎ | ○ | ○ | ○ | ○ |
| Adhesive force | ○ | ◎ | ◎ | ◎ | ○ | ◎ |
| Oil bleeding | ○ | ◎ | ◎ | ○ | ◎ | ◎ |

TABLE 2

| | | Comparative example | | | | | | |
|---|---|---|---|---|---|---|---|---|
| Ingredient (parts) | | 1 | 2 | 3 | 4 | 5 | 6 | 7 |
| A | Septon 4099 | 100 | 100 | 100 | 100 | 100 | 100 | 100 |
| B | FMR 0150 | 100 | 500 | | | 200 | 200 | 200 |
| | Sylvares SA140 | | | 300 | | | | |
| | FTR 8120 | | | | 300 | | | |
| C | Aimarb P140 | 200 | 200 | 200 | 200 | 200 | 200 | |
| D-2 | PW-90 | 400 | 400 | 400 | 400 | 800 | 1000 | 400 |
| D-1 | PW-380 | 400 | 400 | 400 | 400 | | | 400 |
| Total (parts) | | 1200 | 1600 | 1400 | 1400 | 1300 | 1500 | 1100 |
| Melt viscosity (mPa · s) | | Unmeasurable | 5400 | Unmeasurable | 28600 | 14200 | 11000 | Unmeasurable |
| MFR (g/10 min) | | 48 | 148 | 16 | 297 | 138 | 407 | 12 |
| Tensile strength at | 500% | 0.17 | 0.20 | 0.30 | 0.15 | 0.08 | 0.07 | 0.17 |
| 100° C. (kgf/cm$^2$) | 1000% | 0.28 | 0.35 | 0.40 | — | 0.18 | 0.13 | 0.35 |
| Tensile strength at | 500% | 0.20 | 0.60 | 0.34 | 0.15 | 0.12 | 0.08 | 0.19 |
| 20° C. (kgf/cm$^2$) | 1000% | 0.33 | 2.63 | 1.28 | 0.28 | 0.22 | 0.16 | 0.45 |
| Elongation (%) | 100° C. | 2200 | 2200 | 1600 | 800 | 2200 | 2200 | 2200 |
| | 20° C. | 2200 | 1700 | 2100 | 2200 | 2200 | 2200 | 2200 |
| | −20° C. | 1300 | 700 | 800 | 1000 | 1700 | 1100 | 1100 |
| Adhesion strength (PC/PC) (kgf/cm$^2$) | | 0.5 | 3.5 | 1.0 | 0.7 | 1.2 | 1.1 | 2.3 |
| Heat sagging resistance | | ◎ | Δ | ◎ | Δ | ○ | Δ | ◎ |
| Bleeding oil amount (mg) | | 62 | 46 | 60 | 51 | 75 | 89 | 64 |
| Evaluation of properties | | | | | | | | |
| Fludity | | X | ○ | X | ◎ | ◎ | ◎ | X |
| Heat resistance | | ◎ | ○ | ◎ | X | ○ | X | ◎ |
| | | ◎ | Δ | ◎ | Δ | ○ | Δ | ◎ |
| Flexibility | | ◎ | X | X | ◎ | ◎ | ◎ | ◎ |
| Elongayion | | ◎ | X | X | X | ◎ | ○ | ○ |
| Adhesive force | | X | ◎ | X | X | Δ | Δ | ◎ |
| Oil bleeding | | X | ◎ | X | ○ | X | X | X |

As seen from the results shown in Tables 1 and 2, the hot-melt composition of the present invention exhibits excellent performance in heat resistance, adhesion to polycarbonate, fluidity and bleeding resistance. When a product obtained by joining a polycarbonate member and a polypropylene member was assembled by using a sealing material composed of the hot melt composition of the present invention, sufficient sealing properties were provided. The product could be easily disassembled into respective parts without using a special tool.

On the other hand, when the blending amount of the aromatic tackifying resin is too small, fluidity and adhesion were not sufficient and the oil was easy to bleed (Comparative example 1). Conversely, when the blending amount of the aromatic tackifying resin is too large, flexibility and elongation were not sufficient (Comparative example 2). When an aromatic tackifying resin having a large molecular weight is blended, it was impossible to obtain a hot melt composition exhibiting sufficient performance despite the fact that the resin has the same softening point as the resin used in Example 1 (Comparative example 3). When an aromatic tackying resin having a low softening point is blended, it was impossible to obtain a hot melt composition exhibiting sufficient performance despite the fact that the resin has a molecular weight of approximately the same as that of the resin used in Example 1 (Comparative example 4). Further, when the tackying resin of the component (C) is not included, fluidity was not sufficient and oil bleeding was easy (Comparative example 7). When the (D-1) component is not included, bleeding occurred, and adhesion was not sufficient (Comparative examples 5 and 6).

INDUSTRIAL APPLICABILITY

The hot-melt composition of the present invention has good heat resistance and good adhesion to polycarbonate having a polarity, suppresses bleeding of oil, and can easily separate members at the time of disassembly, and thus the hot-melt composition is suitable as a hot-melt sealing material for automobile lamps. In addition, the hot-melt composition is also useful as a waterproof sealing material for automobile parts, electrical products, and building members that use an adherend made of a plastic or a metal.

The invention claimed is:

1. A hot-melt composition comprising, with respect to 100 parts by mass of a hydrogenated styrene thermoplastic elastomer having styrene-based polymer blocks at both ends and a hydrogenated diene polymer block at a middle portion and having an a mass-average molecular weight of 250,000 to 600,000 (A), 150 to 450 parts by mass of an aromatic tackifying resin having a softening point of 135 to 160° C. and a mass-average molecular weight of 500 to 2,500 (B), 100 to 500 parts by mass of a tackifying resin for a hydrogenated diene polymer block which has a softening point of 100 to 160° C. (C), 500 to 1,500 parts by mass of a non-aromatic hydrocarbon oil having a kinematic viscosity at 40° C. of 90 mm$^2$/s or higher (D), wherein 30% by mass or more of the non-aromatic hydrocarbon oil (D) is a non-aromatic hydrocarbon oil having a kinematic viscosity at 40° C. of 300 to 500 mm$^2$/s (D-1).

2. The hot-melt composition according to claim 1, which has a melt viscosity at 220° C. of 5,000 to 200,000 mPa·s and an MFR at 120° C. of less than 200.

3. The hot-melt composition according to claim 1, wherein the component (A) is SEEPS.

4. The hot-melt composition according to claim 1, wherein the component (B) is a tackifying resin having an iodine value (g/100 g) of 20 or less.

5. The hot-melt composition according to claim 1, wherein the component (C) is a hydrogenated alicyclic tackifying resin.

6. The hot-melt composition according to claim 1, wherein the component (D) is a paraffinic hydrocarbon oil.

7. The hot-melt composition according to claim 1, wherein the component (D) contains 30 to 100% by mass of the component (D-1) and 0 to 70% by mass of a hydrocarbon oil having a kinematic viscosity at 40° C. of less than 300 mm$^2$/s (D-2).

8. A sealing material comprising the hot-melt composition according to claim 1.

9. The sealing material according to claim 8, which has a tensile strength at a tensile elongation of 1,000% at 20° C. of 0.8 kgf/cm$^2$ or lower, a tensile elongation ratio in a range of −20 to 100° C. of 1,000% or higher, an adhesion strength to polycarbonate at 20° C. of 1.5 kgf/cm$^2$ or higher and an amount of bleeding oil measured after being kept still at 80° C. for 24 hours in a 50% compressed state of less than 60 mg.

10. The sealing material according to claim 8, which is used for a lighting device of an automobile.

* * * * *